Figure 1:
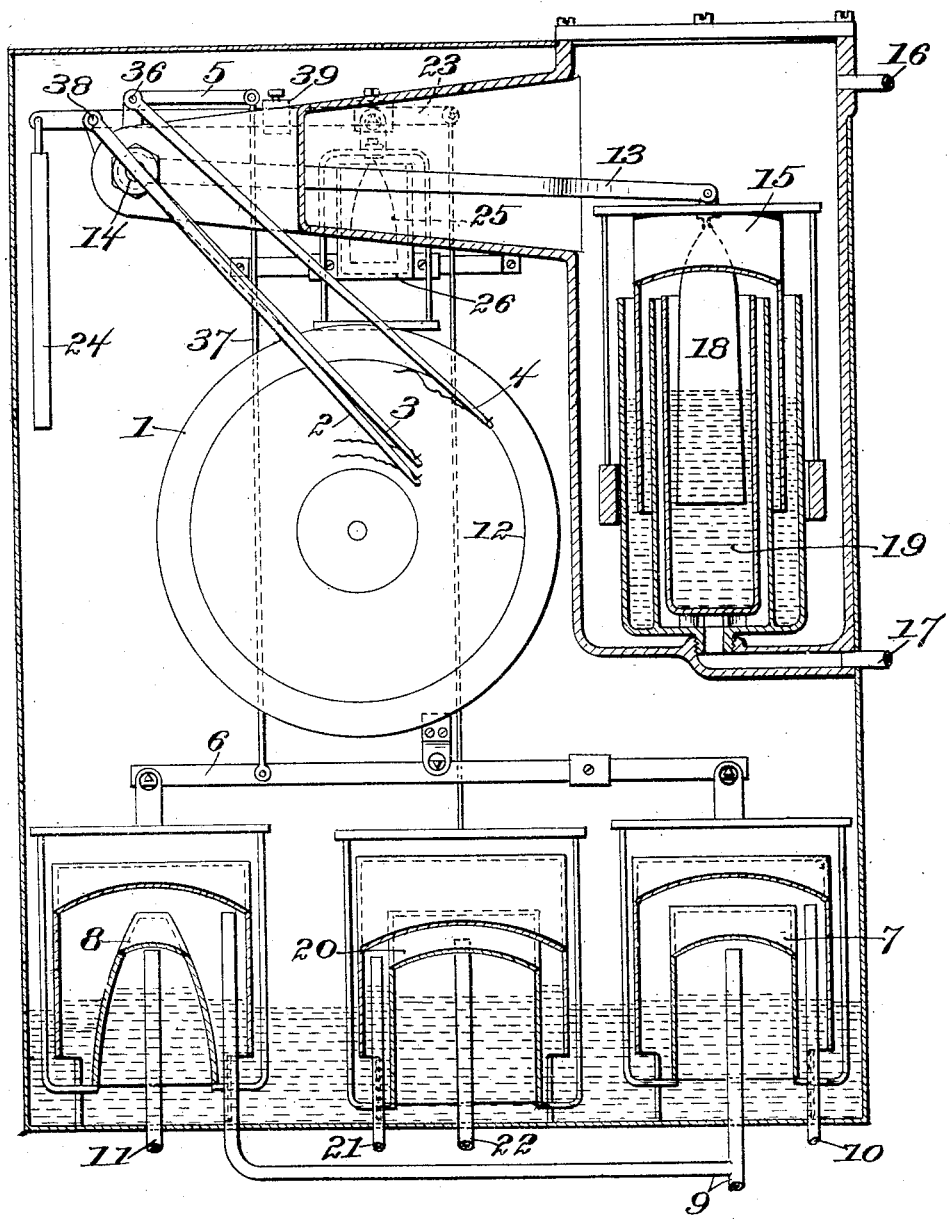

E. G. BAILEY.
RELATION INDICATOR.
APPLICATION FILED MAY 18, 1914.

1,257,965.

Patented Mar. 5, 1918.
3 SHEETS—SHEET 1.

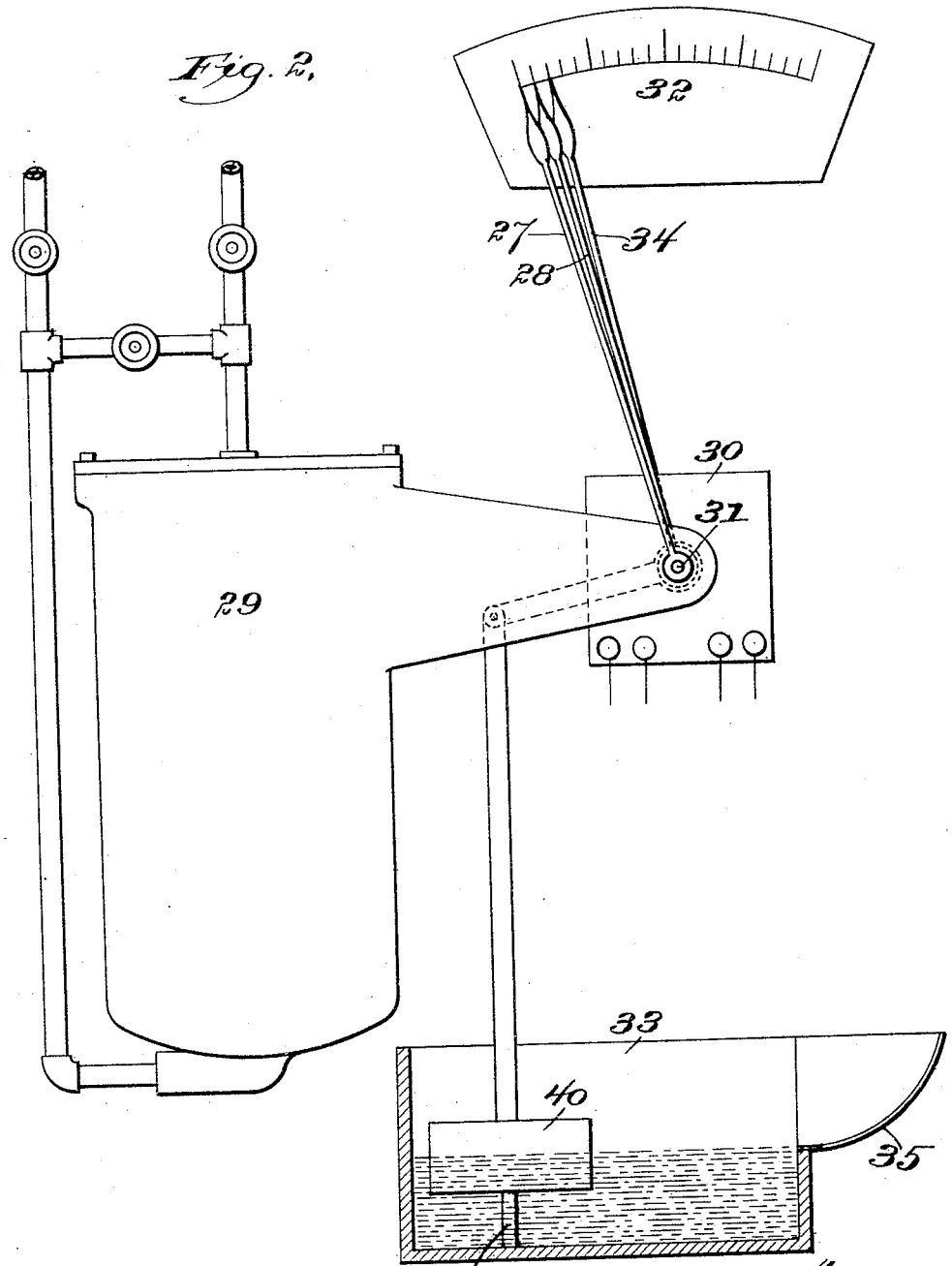

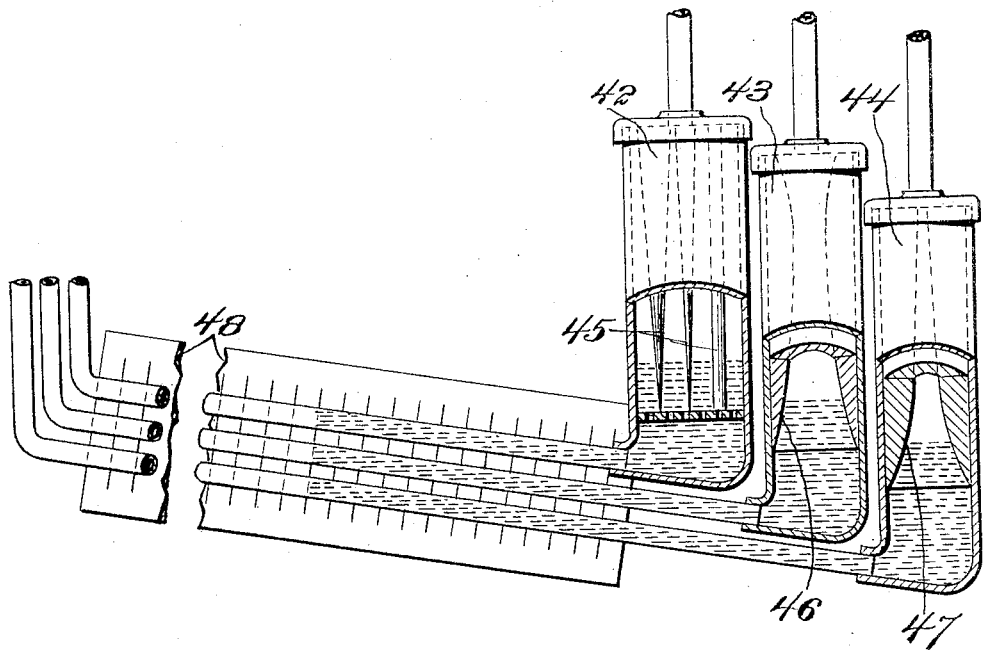

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

RELATION-INDICATOR.

1,257,965.  Specification of Letters Patent.  Patented Mar. 5, 1918.

Application filed May 18, 1914. Serial No. 839,320.

*To all whom it may concern:*

Be it known that I, ERVIN G. BAILEY, a citizen of the United States, residing in Newton Highlands, in the county of Middlesex and State of Massachusetts, have invented an Improvement in Relation-Indicators, of which the following description, in connection with the accompanying drawings, is a specification, like letters on the drawings representing like parts.

The present invention relates to a relation-indicator, and is embodied in an instrument adapted to be used in conjunction with a power producing or using apparatus for the purpose of continuously showing whether or not the condition of best efficiency exists at any and all rates of output and also showing the nature of the departure from the condition of best efficiency, should such take place.

The instrument embodying the invention consists of a plurality of devices or meters which may be of any suitable known type, such as pressure gages, flow meters, watt meters, etc., each having an index or pointer that is moved in a definite manner in response to changes in the magnitude of one of the factors which is essential to the operation of the power producing or using apparatus to which the invention is applied; the novelty of the invention lying in the proper arrangement of the indices with relation to each other, together with the requirement that at least one of the devices is provided with means whereby it shows a fictitious reading so to speak, instead of showing the reading that would normally be given should a similar device be used to measure the factor alone. Furthermore, this false or fictitious reading, thus obtained is not readily useful in itself as an absolute measure of the factor to which it responds, but only serves to show whether or not the proper relation exists between this and some other factor which factors are coactive in the same apparatus. This proper arrangement of the several indices and the modifying of one or more of the several devices, so that at least one of the devices will give a fictitious reading is herein termed the "correlation" of the devices and is brought about for the purpose of making all of the indices show the same reading at any and all rates of output of the apparatus so long as the different factors hold the proper relation to each other.

Examples of what I regard as active factors in a power producing or using apparatus within the scope of my invention, are the flow of air to support combustion, the flow of steam and the flow of the products of combustion in the case of a steam generator, the flow of steam and other fluids in a turbine, engine or pump, the flow of electricity (which for the purposes of my invention may be regarded as a fluid) in an electric generator, or in an electric motor, the flow of liquid fuel, or of gaseous fluid, to a power generator, the pressure of such fluids, the speed of the moving parts of such an apparatus and the heat of the fluids in such an apparatus.

When I refer to the "relation" that does or should exist between two variable active factors, I do not mean merely the simple ratio that exists at any one particular rate of output or under one set of conditions, but I use the word in its broad sense as applied to a physical law which exists between two factors whatever the intensity or value of one may be. All physical laws may be expressed by means of mathematical equations or formulas, although many of them are so complicated that in practical engineering work the relation is shown by plotting the factors and showing the relation as a graphic curve.

For example, if we desire to indicate the condition of desired efficiency of an electric generator in which the input is the steam consumed and the output is the kilowatts developed, we know that throughout the range of output the relation of these two factors is such as to be capable of expression by a mathematical equation in which we may call the steam input $x$ and the kilowatt output $y$. The difficulty of indicating the relation between these two factors $x$ and $y$ in any apparatus is that they do not bear to one another any simple relation nor even a constant ratio. That is $x$ is not to $y$ as 1 is to 2 or as 2 is to 3, but the relation is much more complicated, in fact it may be expressed by the equation $x = fy + a$ where $f$ is some function of $y$ and $a$ is a constant. That function may be a multiple or a divisor or a power or a root, etc., etc. In the use of the apparatus the steam input $x$ may vary from ten per cent. to one hundred per cent. of the capacity of the apparatus. At any given value of steam input $x$, the value of $y$ is determined by the equation. In other words, a perfectly definite rate of steam input $x$ is required to produce a given rate of electrical output $y$. For each different value of $y$, $x$ will have a corresponding and definite value in accordance with the equation, or water rate curve of the turbine, so long as the desired operating efficiency exists. But should some change take place in the mechanical adjustments or the operating conditions of the turbine, that would affect its efficiency, then a different relation or equation would exist between $x$ and $y$. The purpose of the present invention is to show whether or not the desired relation exists between two factors corresponding to $x$ and $y$, in other words, whether or not their relative values conform to the proper equation, whatever their actual values or the rate of output of the apparatus may be. This object is accomplished in my present invention by providing separate devices or meters that will respond to each of the factors respectively, such as $x$ and $y$, and also to provide means to so correlate the device that indicates the value of $x$ with the device that indicates the value of $y$, that the index or pointer of the $x$ device will coincide with and show the same reading as the index of the $y$ device, whatever may be the rate of output of the apparatus as a whole, so that as long as $x$ and $y$ have values that satisfy the equation determining their relation, the coincidence of the indices thus shows that the apparatus is working at its best efficiency; and a lack of such coincidence will not only show that the proper relation for best efficiency does not exist, but it will show the nature and probable cause of the inefficiency.

In like manner there is a perfectly definite and fixed relation between the rate of input and the rate of output or between any other similar active factors in all kinds of power producing or using apparatus, in accordance with the physical law existing between the two factors. The foregoing statement holds true for all rates of output of the apparatus no matter how complex the relation between the factors may be, so long as the mechanical and controllable operating conditions remain normal in accordance with certain standards. The object of this invention is to provide an indicator that will instantly and clearly show in itself alone, without the necessity of any calculation or reference to tables or curves and so that any attendant can know instantly whether or not the desired efficiency of the apparatus is being maintained, and if not, what controllable operating conditions are at fault and what should be done to remedy them.

The instrument embodying my invention, therefore, consists of a plurality of mechanical devices, each of which is operated upon by a force which is a function of one of the factors; combined with suitable means correlating the said devices, so that any departure from the desired relation between the several factors at any and all rates of output is indicated at a single reading of the indices. The correlation above described is accomplished by suitably making, selecting, arranging, modifying, or adjusting the mechanical devices or meters so that the index or pointer of one, two or more of them will always show the same reading as the index or pointer of the other one when the operating forces hold the relation to each other which ought to exist at the rate of output which is being maintained, and this will also be true for any other rate of output which may happen to exist in the normal operation of the apparatus.

I am aware of the fact that measuring instruments operating by pressure differences or other varying active factors entering into the operation of an apparatus have been used in the attempt to indicate the efficiency condition of said apparatus. So far as I have seen, however, the instruments which have been devised for this purpose prior to my invention indicate simply the actual values of the pressure difference or other factors, or the actual value of the ratio which exists at the time of observation. As above stated, however, the desired result, attained by my invention is not accomplished by showing the actual values of the factors or what actual relations exist between them, but shows at a single reading whether or not the relation corresponding to the condition of best efficiency is the existing relation at the time of observation regardless of what the rate of output may be. This entirely new and practicable result is obtained in accordance with my invention by the means included in the embodiment of the invention correlating the devices operated by the active factors.

Instruments of various forms all of which embody the generic features of my invention can be devised for use in connection with any apparatus such as I have referred to above; and for the purpose of illustrating the invention I have herein shown an instrument especially adapted for use in connection with a steam boiler; and have also shown several modifications which may be readily adapted for other uses.

It is to be understood that the specific construction and arrangement of the several mechanical devices or meters which are associated in carrying out the present invention form no part of the invention and these devices may be of any known form or character.

Figure 1 is a vertical section, partly in elevation of an instrument embodying my invention, the said instrument being especially adapted for use in connection with a boiler plant in which the factors used in the operation of the instrument are the rate of flow of air, the rate of flow of steam, and the fuel bed resistance; Fig. 2 is a similar view of an instrument in which the associated devices are an electric meter, a steam flow meter, and a water meter; and Fig. 3 is a view illustrating a combination of U-tube gages as the devices which may be utilized in carrying out my invention.

In Fig. 1 I have shown the instrument as provided with a chart 1, in conjunction with several indices, in this instance pens 2, 3, and 4, the said chart being in view so that it constitutes an indicator scale as well as a recording means to afford a permanent record of conditions. This instrument is especially adapted for use in connection with a steam generator burning solid fuel, in which the flow of air should bear a certain determinable relation to the flow of steam throughout the entire range of output, while the resistance of the fuel bed should also bear a determinable relation to the rate of flow of air when the fuel bed is in the condition of best efficiency.

I have shown the instrument chosen to illustrate this invention, as completely equipped with means for showing the fuel bed condition as well as the condition which depends upon the right relation between the rate of flow of air and the rate of flow of steam. The present invention, however, is embodied in the combination and means for correlation of the devices which show the departure from the desired relation between the rate of flow of steam and the rate of flow of air, and involves the devices operating the pens 2 and 3, the construction and arrangement of the pen 4, being set forth in a prior patent, Number 1,153,414, granted to me September 14, 1915.

The pen 3 which moves in response to the rate of flow of steam is operated through a beam 13 pivoted at 14 and acted upon by a bell 15 which is arranged to receive pressures on opposite sides through the pipes 16 and 17 which lead from the respective sources of pressure. The bell 15 is sealed in a liquid and rises or falls in response to differences in pressure, the action of the device being modified by means of a displacing member 18 part of which extends into a liquid 19 whereby a state of equilibrium is brought about. The pen 2 which moves in response to the rate of flow of air is operated upon by a similar device comprising a liquid sealed bell 20 receiving pressures on opposite sides, through the pipes 21 and 22, and the said bell is attached to a beam 23 pivoted at 38 and balanced by a weight 24. This bell is similarly associated with a displacing member 25 which extends into a liquid contained in a receptacle 26, and equilibrium is thereby brought about as described in connection with the device which operates the pen 3.

By suitably shaping the displacing member 18 according to the law of the flow of steam through an orifice, or other corresponding means, the motion of the pen 3 can be made to follow any desired relation to the rate of flow. It is desirable that this pen motion should be in direct proportion to the rate of flow so that the chart records may be easily measured. In a similar manner the shape of the displacing member 25 constitutes the means correlating the devices and is made in accordance with the relation between the two factors, viz: the rate of steam flow and rate of air flow, or the pressure differences which are functions of the same, as empirically determined for all rates throughout the range of operation; so that the pen 2 will always lie immediately in front of the pen 3 and thereby show and record the same reading as pen 3 when the rate of air supply is as desired, regardless of whether the rate of steam output is great or small; and in response to any changes in the rate of steam output the pens 2 and 3 will move in unison so long as the proper relation is maintained.

The general law governing the relation between steam output and the pressure difference which is a function of the air supply, may be used in designing the shape of the displacing member 25 as a standard part of the instrument to be applied to any boiler. Then suitable adjustments are provided for by affording means for changing the length of the moment arm through which the displacing member 25 acts, the normal level of the liquid in the receptacle 26, the density of the liquid, and the position of the balancing weight 39, in accordance with the empirical determinations in any individual boiler, so that the pens 2 and 3 will give the same reading, so long as the desired conditions exist regardless of the rate of output. It is obvious, however, that the chart or its equivalent is not an essential element to the instrument, for without any chart, scale, or any background whatever, a person can see whether or not the two pens 2 and 3 are together.

The usefulness of such an instrument is greatly enhanced if it has, in addition to means for performing the functions above described, further means for recording the conditions existing in the operation of an apparatus at all times, whether or not the desired relation is departed from. The instrument shown in Fig. 1, for example, is capable of recording the departure and extent of departure from the desired condition throughout a given period of operation. The pen 3, which shows a measure of the rate of steam output is supplied with ink of one color, while the pen 2 is supplied with ink of a different color. So long as the desired relation exists between the rate of air supply and the rate of steam output, these two records coincide, and make a characteristic record of a substantially single line of blended color. It is obvious that any other characteristic markings may be used, such as may be found convenient. This results in the decided advantage that the instrument shows on the record, not only the time when the desired relation was not maintained; but also to what extent the relation was departed from and which of the factors was excessive or deficient at that time.

The pen 4, in conjunction with the line 12 on the chart 1 serves to indicate the fuel bed condition and is readily incorporated, as shown, in the instrument, so as to give a complete record. The bells 7 and 8 may be immersed in the same liquid which seals the bell 20, the said bells being hung from the beam 6 and acted on by pressures conducted through pipes 9, 10, and 11. The pen 4 is pivoted at 36 and actuated through the arm 5 and the link 37 which is connected to the beam 6.

In Fig. 2 I have shown another form of instrument embodying the invention, this instrument being intended for use in connection with electric generators in which there is, under conditions of best efficiency, a determinable relation between the rate of flow of steam and the kilowatt output of the generator. This relation like the others is more complex than a simple ratio and is usually expressed in the form of a curve showing the steam consumption or water rate at different loads; and in order, therefore, that any departure from the desired relation may be readily shown by the instrument, the elements previously described in connection with Fig. 1, namely, the several devices having indices and the means for properly correlating them constitute the main elements of the instrument.

The indices, which are moved in response to forces which are functions of the variable active factors of the apparatus, consist, in this instrument, of pointers 27 and 28, which are operated respectively by two devices, viz: a steam flow meter 29 and a wattmeter 30, the steam flow meter being represented as an instrument like that shown and described in connection with Fig. 1, except that the shape of the displacing member may be different as required, for correlation, while the wattmeter can be of any suitable or usual type. In this instrument, the indices or pointers are shown as pivoted on a common axis at 31, and adapted to travel over a graduated scale 32, which may, if desired, be graduated in terms of kilowatt output. Assuming that the scale is so graduated, the steam flow meter 29 is the element which is modified to effect the correlation, so that the position of the index 27 does not indicate the value of the pressure difference nor the rate of flow of steam which is utilized to move the index, but does indicate, in conjunction with the wattmeter indicator, any departure from the desired relation between the steam flow and electrical output.

This instrument is further provided with a third device comprising means for measuring the water of condensation; and in the construction shown, a liquid meter of an improved weir type is employed and indicated by the reference numeral 33. The necessary correlation is effected by means of the shape of the weir opening so that the pointer 34 will always show the same reading as the indices 27 and 28, when the desired relation exists between the quantity of water and the kilowatt output or the rate of flow of steam.

The aperture or weir opening of this liquid meter is through a curved or warped surface 35, the curvature of which surface is so designed and constructed as to give any desired relation between rate of discharge and head, as fully described in a prior application for Letters Patent of the United States filed by me January 22, 1913, Serial Number 743,479. Any suitable meter, however, may be used without departing from the present invention.

The instrument shown in Fig. 3 comprises a series of modified U-tube pressure gages 42, 43, and 44, and the surface of the liquid in one leg of each tube constitutes the index and moves in response to variations in difference of pressures, the opposing pressures acting on each tube together constituting a function of one of the associated factors. In this instrument the means correlating the factors is embodied in displacing members 45, 46, and 47, of variable area or the equivalent of same which are inserted in the branches of the several tubes so that the readings in the tubes are not necessarily in terms of actual quantity or value but are such that the liquids in all of the tubes will read on or equi-distant from the same graduation of a simple scale 48 when the right relation exists between the factors operating the several gages regardless of their actual value. These displacing members may be exchanged for others, or others added, in accordance with the empirically determined requirements of any individual case, thus forming an adjustable feature. The shapes of the displacing members are determined from empirical observation of the apparatus to which the instrument is to be applied, such as a steam generator, in which the rate of steam output, the rate of gaseous or liquid fuel supply, rate of air supply, etc., are the factors, the relation between which is under observation. Or if the invention is to be applied to a pumping outfit in which the rate of steam consumed and the pumpage delivered are the factors, the relation between these factors is determined. Throughout the range of output, in either case, the proper shaped displacing members are properly inserted so that whenever the desired relation exists, the liquid in the several tubes will have the same motion and lie upon or near the same graduation of the scale.

It will be seen from the foregoing description that the basic features of my invention, which are found in all of the instruments chosen for purposes of illustration, are;— the several mechanical devices or meters with their respective indices; means whereby the variable active factors of a power producing or using apparatus are applied to said devices respectively; and means correlating said devices so that the relative position of the indices shows the existence or non-existence of a definite relation between the several factors at all rates of output of the apparatus.

It is obvious that the specific construction and arrangement of the several devices or meters themselves, or the means correlating them, may be such as will best suit the apparatus with which the instrument is intended to be used; and any choice as to the specific mode of operation, form, or arrangement of said movable elements can be made without departing from the invention.

The term "correlate" is used herein as meaning not merely the placing of two pointers in juxtaposition, or in such location relative to one another that their readings may be read simultaneously, and compared readily as to the equality of reading or as to the difference between the readings of the two, but involves further an organic or structural adaptation or modification of the means or connections through which one or more of the pointers responds to the factor the condition of which is indicated by it, in such manner that the readings of each pointer are related to and significant in connection with the reading of some other pointer, rather than as a correct indication of the factor for which it indicates, independently considered.

In an instrument made in accordance with this invention, it is not necessary that any of the pointers or indicators should read correctly for the conditions of the factor to which it pertains, and in most applications of the invention, the effect of the correlating means will be such that one or more of the pointers does not indicate correctly the condition of the factor to which it pertains, if individually considered, but only indicates the condition of the factor that should prevail when the other factors are in such condition as to give the same or a coincident reading.

For purposes of clearly showing the utility and mode of operation of the instrument embodying the invention, its application to certain apparatus has been illustrated and described as a convenient example of a use to which the instrument may be put; but it is to be understood that the said instrument is capable of other uses, and that the invention is not limited to the particular use described.

What I claim is:

1. A relation indicator to show whether or not the desired relation exists between two coactive factors in a power producing or using apparatus consisting of a combination of two mechanical devices, each having an index and each being actuated by one of the respective factors; and means correlating said devices whereby their indices coincide whenever the desired relation exists between the two said factors.

2. A relation indicator to show whether or not the desired relation exists between two coactive factors in a power producing or using apparatus, comprising a mechanical device having an index; means whereby said device is operated by one of said factors; a second mechanical device having an index; means whereby said second device is operated by the second said factor; and means whereby the second said device is modified in its action so that its index will not respond in direct proportion to the factor operating it, but in accord with the index of the first mentioned device so long as the desired relation exists between said factors, which relation corresponds to the best efficiency of the apparatus.

3. A relation indicator for use in connection with a power using apparatus to show whether or not the desired relation exists between two coactive factors one of which is power input and the other the work done by the apparatus, which relation corresponds to the best efficiency at any rate of output, comprising a meter provided with an index and adapted to respond to the rate of power input; a second meter provided with an index and adapted to respond to the rate at which work is done; and means modifying one of said meters so that instead of its index responding as a true measure of the operating factor it responds in exact accord with the other said index so long as the desired efficiency of the apparatus exists whatever its rate of output may be.

4. A relation indicator for use in connection with a steam generating apparatus to show whether or not the desired relation exists between two coactive factors, such as rate of steam output and rate of air supply for combustion, which relation corresponds to the best efficiency at any and all rates of output, comprising a steam flow meter provided with an index and adapted to indicate the rate of steam output; a mechanical device provided with an index and adapted to respond to changes in the rate of air supply; and means embodied in said device causing its index to appear in coincidence with the index of said meter when the proper amount of air is being supplied to efficiently generate the amount of steam, whatever the rate of steam output may be.

5. A relation-indicator to show continuously and at all rates of output of a power generating or using apparatus the existence or non-existence of the desired relation between factors which are functions of such apparatus, having in combination devices each provided with an index; means operating each index by one of said factors; and means whereby one of said factors is caused to arbitrarily move its own index in accordance with the law determining the relation between the factors, instead of in accordance with the actual value of the factor.

6. A relation indicator to show continuously and at all rates of output of a steam generating apparatus the existence or non-existence of the desired relation between the rate of steam output from the boiler and the rate of supply of air for combustion, the relation between said rates differing in value at different rates of output of said apparatus; having in combination a plurality of indices; mechanical devices operating said indices; means connecting said mechanical devices to said apparatus for causing the differential pressures that are respectively functions of said rate of steam output and of said rate of supply of air to act upon said devices; and means correlating said devices and said indices for causing said indices to point to a common graduation when the desired relation exists.

7. An instrument for showing whether or not a certain desired relation exists between two or more differently varying factors, which consists of several mechanical devices, each of which is operated upon by a force controlled by and which is a function of one of said factors; and means correlating said devices to cause them to show the same readings when the said desired relation exists, regardless of the actual values of the factors.

8. An instrument for showing whether or not a certain desired relation exists between two or more differently varying factors, which consists of mechanical devices having indices each of which devices is operated on by a force controlled by and which is a function of one of said factors respectively; and means correlating said devices to operate said indices in unison and coextensively when the said relation exists for any value of the principal factor.

9. An instrument for showing whether or not a certain desired relation exists between two or more differently varying factors, of a power producing or using apparatus, which instrument consists of two or more mechanical devices each having an index; means whereby each of said devices is operated on by a force controlled by and which is a function of one of said factors; means correlating said devices whereby they operate said indices in unison and coextensively when the said relation exists throughout the range of output of the apparatus; and means for recording the existence or non-existence of said desired relation.

10. The herein described instrument for use in connection with a power producing or using apparatus, which consists of a mechanical device, which is operated in response to some force controlled by and which varies as some function of the rate at which energy is used by the apparatus; another mechanical device which is operated in response to some force, which varies as some function of the rate of work done; indices operated by said devices respectively; and means correlating said devices whereby the indices operated by them show readings bearing the same relation to one another at all rates of output when the condition of the desired efficiency exists.

11. The herein described instrument for use in connection with a power apparatus, which consists of a mechanical device, which is operated in response to some force, which varies as some function of the rate at which energy is used by the apparatus; another mechanical device which is operated in response to some force controlled by and which varies as some function of the rate of work done; indices; means correlating said devices to operate said indices in unison and coextensively when the desired efficiency condition exists at all rates of output; and means for continuously recording the positions of said indices.

12. The herein described instrument for giving a ready comparison of the important factors which enter into the operation of a steam generating apparatus, which consists of a movable element having an index; means for operating said index in response to variations in the rate of steam output from the boiler; a second movable element having an index; means for operating said index in response to variations in the rate of supply of air for combustion; and means correlating said elements so that the same relative reading is shown by both indices when the air supply is in the desired relation to the steam output at any and all rates of output.

13. An instrument comprising two mechanical devices, which are operated by forces, controlled by and being functions of the rate of flow of steam from a boiler, and of the rate of the supply of air to the boiler furnace, respectively; indices; and means correlating said devices to operate said indices in unison and coextensively at all rates of output when the relation between the rate of flow of steam and the rate of supply of air is that which exists when the apparatus is operating at its best efficiency.

14. The herein described relation indicator, which consists of a pressure gage having an index; a second pressure gage having an index; and means correlating the action of said pressure gages, whereby both indices will bear the same relation to one another at all rates of output of the apparatus to which said indicator is applied when the desired relation exists between said pressures.

15. The herein described relation indicator, which consists of a pressure gage having a pen coöperating with a chart; a second pressure gage having a pen also coöperating with said chart; and means whereby the actions of said pressure gages may be correlated, so that both pens will give the same relative reading and substantially coincident records on the chart, so long as the relation between the pressure differences is as desired, at all rates of output of the apparatus to which said indicator is applied, regardless of the actual value of one of said pressure differences.

16. The herein described relation indicator which consists of a pressure gage having a pen coöperating with a chart; a second pressure gage having a pen also coöperating with said chart; means whereby the actions of said pressure gages may be correlated so that both pens will give the same reading and substantially coincident records on the chart when the relation between the pressure differences is as desired, regardless of the actual values of said pressure differences; a pressure relation gage provided with a pen also coöperating with said chart; and means incorporated in said pressure relation gage for maintaining the said pen stationary in a predetermined position relative to the chart so long as the relation between the pressures remains as desired, regardless of the actual values of said pressures.

In testimony whereof, I have signed my name to this specification in the presence of two subscribing witnesses.

ERVIN G. BAILEY.

Witnesses:
JAS. J. MALONEY,
M. S. MALONEY.

Copies of this patent may be obtained for five cents each, by addressing the "Commissioner of Patents, Washington, D. C."